(12) United States Patent
Holloway

(10) Patent No.: US 9,845,840 B2
(45) Date of Patent: Dec. 19, 2017

(54) ECCENTRIC TOOL

(71) Applicant: GOODRICH CORPORATION, Charlotte, NC (US)

(72) Inventor: Gary Holloway, Ontario (CA)

(73) Assignee: GOODRICH CORPORATION, Charlotte, NC (US)

( * ) Notice: Subject to any disclaimer, the term of this patent is extended or adjusted under 35 U.S.C. 154(b) by 147 days.

(21) Appl. No.: 14/244,519

(22) Filed: Apr. 3, 2014

(65) Prior Publication Data

US 2015/0075309 A1 Mar. 19, 2015

Related U.S. Application Data

(60) Provisional application No. 61/878,928, filed on Sep. 17, 2013.

(51) Int. Cl.
| | | |
|---|---|---|
| F16H 35/06 | (2006.01) | |
| F16H 1/20 | (2006.01) | |
| F16H 1/06 | (2006.01) | |

(52) U.S. Cl.
CPC ............ F16H 1/20 (2013.01); F16H 1/06 (2013.01); *Y10T 74/19619* (2015.01); *Y10T 74/19651* (2015.01)

(58) Field of Classification Search
CPC . B25B 17/00; B25B 17/02; F16H 1/06; F16H 1/20; F16H 55/084; F16H 2057/0224
USPC ............ 74/406, 431, 570.1, 571.1; 81/57.3; 173/29, 170; 244/100 R, 102 SS
See application file for complete search history.

(56) References Cited

U.S. PATENT DOCUMENTS

| | | | | |
|---|---|---|---|---|
| 2,477,587 | A * | 8/1949 | Doutt ................ | F16C 3/28 74/55 |
| 2,479,144 | A * | 8/1949 | Voycheske .......... | B25B 27/0035 74/397 |
| 2,590,675 | A | 3/1952 | Bottorff | |
| 2,592,237 | A | 4/1952 | Bradley | |
| 2,960,287 | A * | 11/1960 | Barlow ................ | B64C 25/20 244/102 R |
| 4,311,063 | A * | 1/1982 | Sistare ................ | B24B 23/028 74/395 |
| 4,515,043 | A | 5/1985 | Gray | |
| 4,580,460 | A * | 4/1986 | Chang ................ | B23D 51/16 74/395 |
| 5,104,061 | A * | 4/1992 | Doane ................ | B64C 3/40 244/131 |
| 5,179,876 | A * | 1/1993 | Gadea Mantilla .... | B60B 29/005 81/57.14 |

(Continued)

OTHER PUBLICATIONS

Extended European Search Report dated Sep. 2, 2015 in European Application No. 15160906.2.

*Primary Examiner* — Zakaria Elahmadi
(74) *Attorney, Agent, or Firm* — Snell & Wilmer LLP

(57) ABSTRACT

An adjustment tool is disclosed herein. For example, an adjustment tool is provided comprising an input gear having gear teeth and an output gear having gear teeth, wherein the input gear and the output gear are in meshed engagement, an input shaft centrally coupled to the input gear, wherein the input gear is configured to rotate about the input shaft, and a housing supporting the input shaft for rotation and supporting a fastener, wherein a tooth of the output gear protrudes from the housing.

8 Claims, 6 Drawing Sheets

(56) References Cited

U.S. PATENT DOCUMENTS

| | | | | |
|---|---|---|---|---|
| 5,305,661 | A * | 4/1994 | Schartman | B60G 7/003 403/107 |
| 6,811,117 | B2 * | 11/2004 | Reniau | B64C 25/04 244/102 R |
| 2004/0016313 | A1 * | 1/2004 | Liu | E06B 9/68 74/395 |
| 2005/0279885 | A1 * | 12/2005 | Tebon | B64C 25/00 244/100 R |
| 2010/0107793 | A1 * | 5/2010 | Kurzmann | F16D 1/06 74/395 |

* cited by examiner

ECCENTRIC TOOL

CROSS REFERENCE TO RELATED APPLICATIONS

This application claims priority to and is a nonprovisional application of U.S. Provisional patent application Ser. No. 61/878,928 entitled "Eccentric Bushing Adjustment Tool" and filed on Sep. 17, 2013, the contents of which are hereby incorporated by reference in its entirety.

FIELD

The present disclosure relates to landing gear, and more particularly, to adjustment tools for use in landing gear.

BACKGROUND

Landing gear supports an aircraft while the aircraft is on the ground. Landing gear may comprise a variety of links coupled together at various joints. Relative distances between two points may benefit from adjustment during installation of the landing gear into an aircraft. For example, in dual side stay landing gear, the aft stay length may benefit from adjustment during installation into the aircraft.

SUMMARY

An adjustment tool is disclosed comprising an input gear having gear teeth and an output gear having gear teeth, wherein the input gear and the output gear are in meshed engagement, an input shaft centrally coupled to the input gear, wherein the input gear is configured to rotate about the input shaft, a housing supporting the input shaft for rotation and supporting a fastener, wherein a tooth of the output gear protrudes from the housing.

Further, an apparatus is disclosed comprising, an eccentric bushing having a plurality of circumferentially disposed gear teeth, a secondary bushing disposed within the eccentric bushing, and an aperture disposed within the secondary bushing, an input gear having input gear teeth and an output gear having output gear teeth, wherein the input gear teeth and the output gear teeth are in meshed engagement, wherein the output gear teeth are configured to be placed into meshed engagement with the plurality of circumferentially disposed gear teeth, wherein rotation of the eccentric bushing causes rotation of the secondary bushing, wherein rotation of the secondary bushing causes the aperture to be displaced along a diameter of the eccentric bushing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "meshed engagement" may refer to the engagement of two or more sets of gear teeth. In that regard, while in meshed engagement, two sets of gear teeth may exert rotational force on one another. Stated another way, while in meshed engagement, a first set of gear teeth may drive a second set of gear teeth to rotate.

Figure 1:
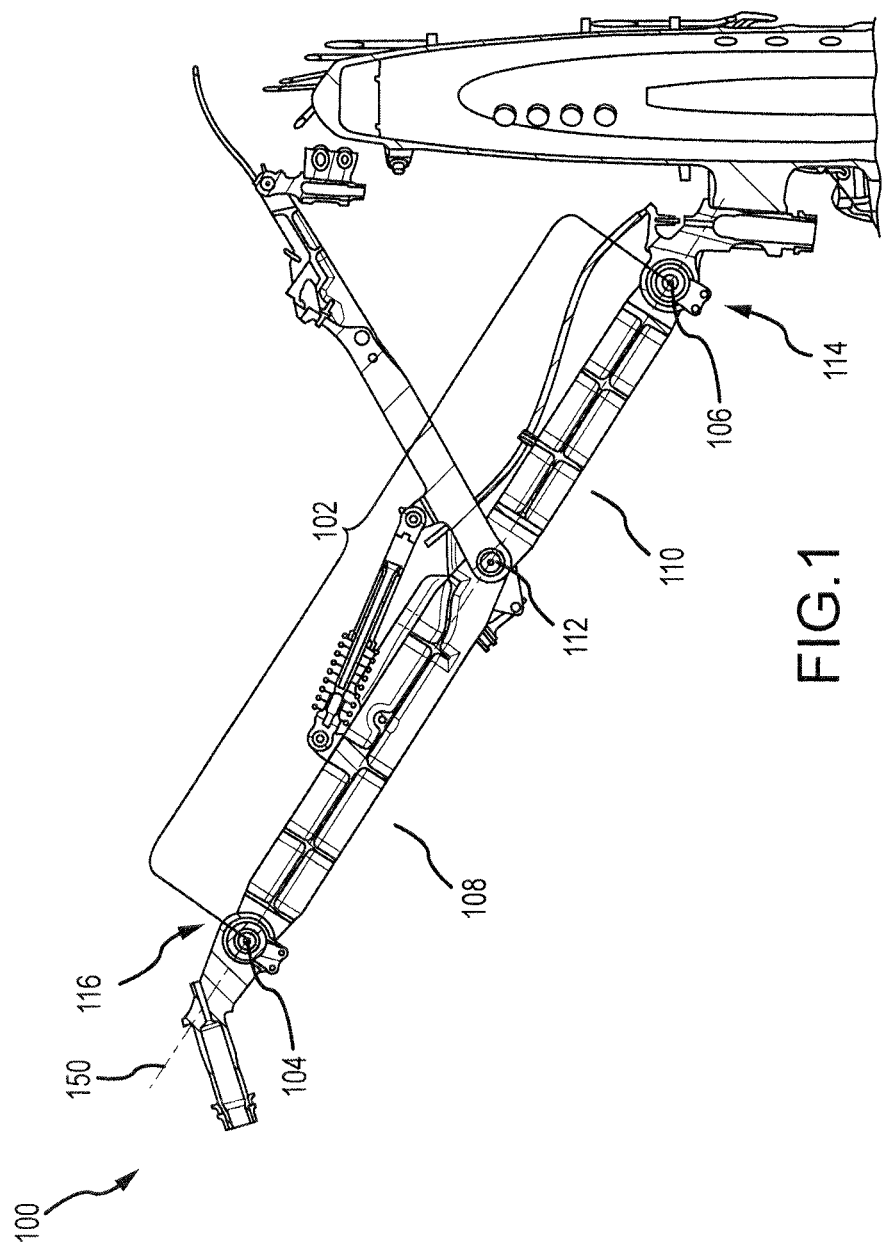
FIG. 1 illustrates, in accordance with various embodiments, a portion of a landing gear.

With reference to FIG. 1, a portion of a landing gear 100 is shown. Upper stay 108 is coupled to lower stay 110 at pivot joint 112. Stay length 102 is shown representing the distance between aperture 104 and aperture 106 when upper stay 108 is positioned 180 degrees from lower stay 110 and pivot joint 112 is fixed to prevent pivoting. Line 150 passes through aperture 104, pivot joint 112 and aperture 106. During installation of the landing gear into the aircraft, it may be desirable to adjust stay length 102. In that regard, eccentric bushing assemblies 116 and 114 are configured such that rotation of an eccentric bushing of the eccentric bushing assembly displaces aperture 104 and/or aperture 106 along a diameter of the eccentric bushing (e.g., along line 150). In that regard, the displacement of aperture 104 and/or aperture 106 will change stay length 102 by either increasing or decreasing the distance of stay length 102. It is desirable to easily and accurately effect rotation of the eccentric bushing during adjustment, but also to prevent rotation of an eccentric bushing when adjustment is not desired. For example, during typical aircraft operation, it would be desirable to constrain the eccentric bushing from rotation.

Figure 2:
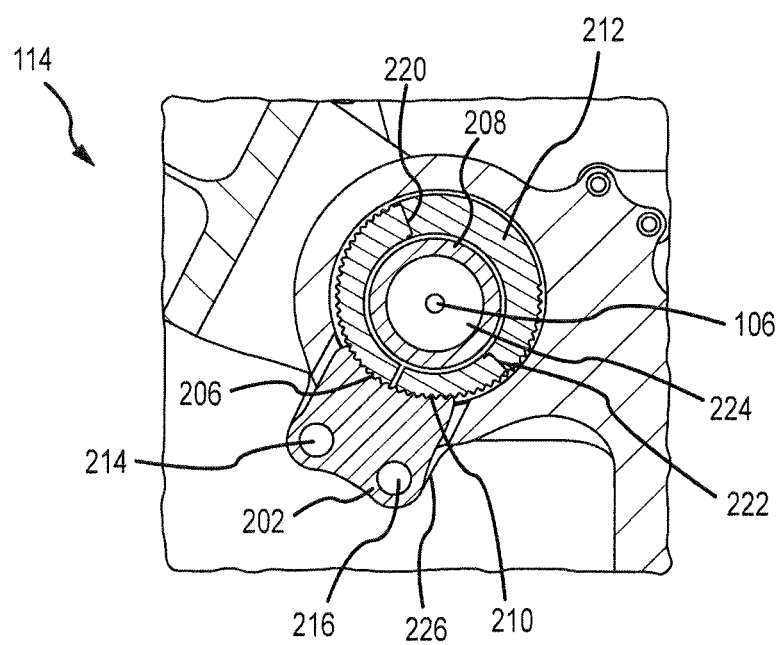
FIG. 2 illustrates, in accordance with various embodiments, an eccentric bushing in meshed engagement with a locking key.

With reference to FIG. 2, eccentric bushing assembly 114 is illustrated. Aperture 106 is shown within secondary bushing 208. Secondary bushing 208 is shown within eccentric bushing 212. Eccentric bushing 212 may comprise any suitable eccentric bushing. Eccentric bushing 212 has a non-zero eccentricity. In that regard, the eccentricity may range from infinitesimally above zero to 1. Eccentric bushing 212 comprises an eccentric annular structure. In that regard, the radial width of eccentric bushing 212 may vary about the circumference of eccentric bushing 212. As shown, for example, radial width 220 at a first portion of the circumference of eccentric bushing 212 is larger than radial width 222 at a second portion of the circumference of eccentric bushing 212. Eccentric bushing 212 may comprise a plurality of circumferentially disposed gear teeth 210. Any number of gear teeth is contemplated herein. Eccentric bushing 212 may comprise any suitable material, for example, titanium, aluminum, steel, stainless steel such as 300 M stainless steel and/or chromium-nickel-tungsten martensitic alloy (also known as Greek Ascoloy).

Secondary bushing 208 may comprise an annular structure. In that regard, secondary bushing 208 may have a circular profile, for example, taking a cylindrical geometry. Secondary bushing 208 may comprise any suitable material, for example, titanium, aluminum, steel, stainless steel such as 300 M stainless steel and/or chromium-nickel-tungsten martensitic alloy (also known as Greek Ascoloy). Secondary bushing 208 may be mounted or otherwise disposed within eccentric bushing 212. In that regard, rotation of eccentric bushing 212 will effect rotation of secondary bushing 208. Due to the eccentricity of eccentric bushing 212, rotation of eccentric bushing 212 will displace aperture 106 along a diameter of eccentric bushing 212.

Support ring 224 may comprise a structure having aperture 106. Support ring 224 may be disposed within secondary bushing 208 and may be configured to rotate with secondary bushing 208.

Locking key 202 may be mounted on joint housing lugs 226 and secured thereto with bolts or other fasteners through apertures 214 and 216. Locking key 202 has a plurality of gear teeth 206. Plurality of gear teeth 206 of locking key 202 is shown in meshed engagement with plurality of circumferentially disposed gear teeth 210 of eccentric bushing 212. In that regard, locking key 202 constrains plurality of circumferentially disposed gear teeth 210 of eccentric bushing 212 from rotation. Locking key 202 may comprise any suitable material, for example, titanium, aluminum, steel, stainless steel such as 300 M stainless steel and/or chromium-nickel-tungsten martensitic alloy (also known as Greek Ascoloy).

Figure 3A:
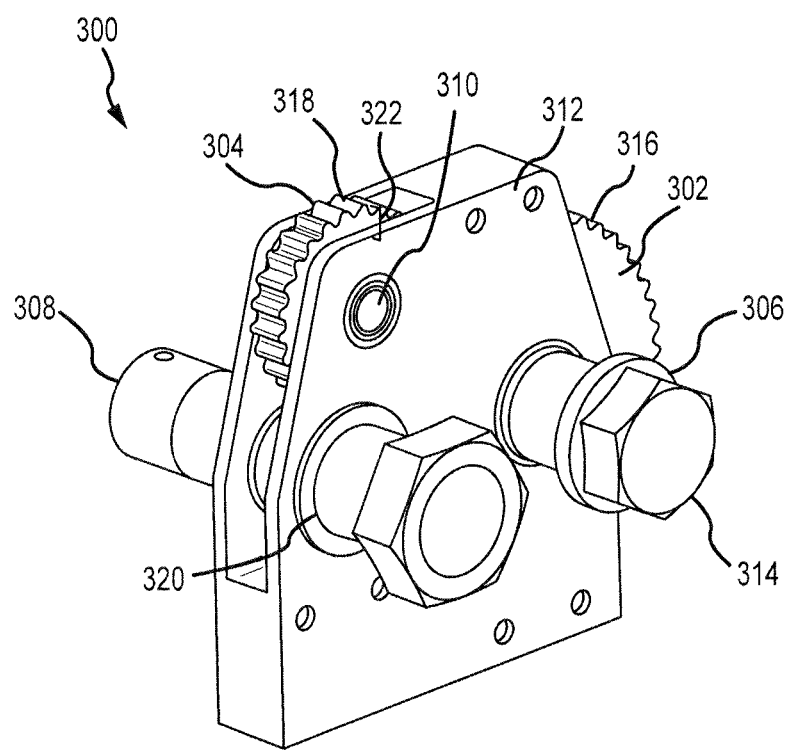
FIG. 3A illustrates, in accordance with various embodiments, an adjustment tool.

With reference to FIG. 3A, when adjustment of stay length 102 is desired, adjustment tool 300 may be used to drive rotation of eccentric bushing 212. Adjustment tool 300 comprises input shaft 306, output shaft 310, input gear 302, housing 312, and output gear 304.

Input shaft 306 may comprise head 314. Head 314 may be configured to engage with any suitable wrench or tool to drive rotation of input shaft 306. In various embodiments, and as shown, head 314 is hexagonal. In various embodiments, head 314 may comprise a slotted screw head, a Philips screw head, a star shaped screw head such as available under the TORX trademark, a square head, or any other suitable geometry to couple to a tool to drive rotation of input shaft 306.

Input shaft 306 supports input gear 302 for rotation. Input shaft 306 thus comprises an axis of rotation of input gear 302. Input gear 302 comprises plurality of gear teeth 316.

Output shaft 310 supports output gear 304 for rotation. Output shaft 310 thus comprises an axis of rotation of output gear 304. Output gear 304 comprises plurality of gear teeth 318.

Housing 312 comprises generally parallel plates that support input shaft 306 and output shaft 310. Housing 312 also comprises aperture 320. Aperture 320 may accept a bolt 308 for securing housing 312 to joint housing lugs 226. It is contemplated that any suitable fastener may be used with aperture 320 to secure housing 312 to joint housing lugs 226. Output gear 304 and/or plurality of gear teeth 318 of output gear 304 may protrude from housing 312, for example, as in protrusion 322. Protrusion 322 may allow plurality of gear teeth 318 of output gear 304 to be disposed in meshed engagement with eccentric bushing 212.

Figure 3B:
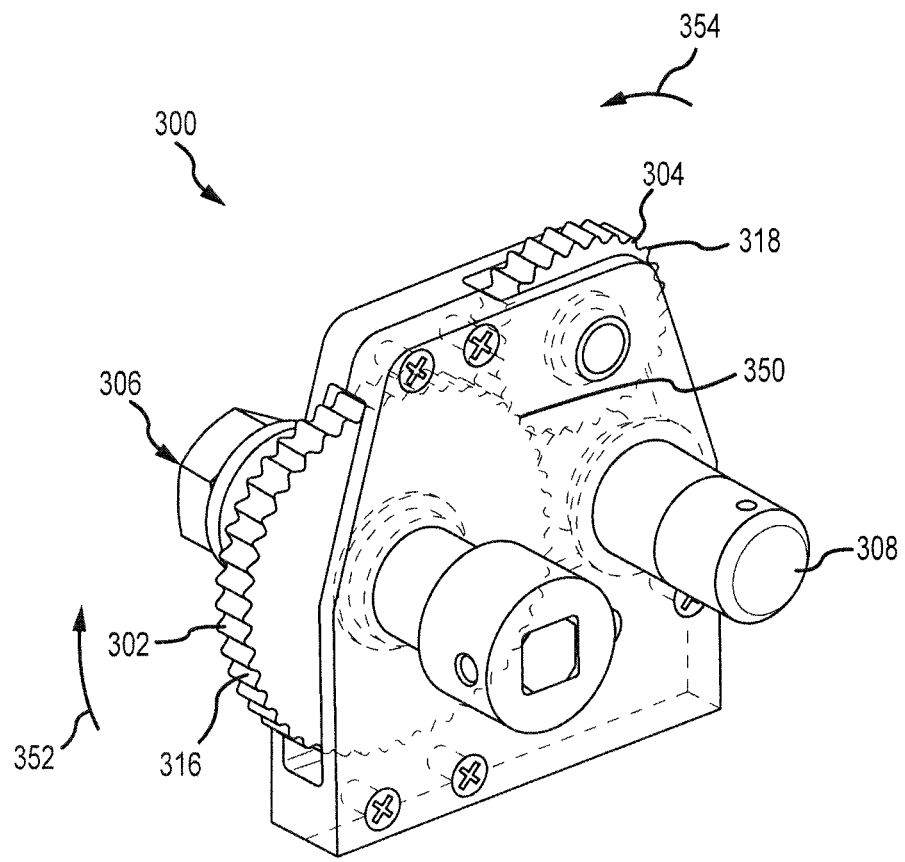
FIG. 3B illustrates, in accordance with various embodiments, an adjustment tool illustrated with a housing shown transparently for clarity.

With reference to FIG. 3B, a portion of housing 312 is shown transparently for clarity. Plurality of gear teeth 318 of output gear 304 is shown in meshed engagement 350 with plurality of gear teeth 316 of input gear 302. In that regard, input shaft 306 may rotate input gear 302 in direction 352. Through meshed engagement 350, input gear 302 may drive rotation of output gear 304 in direction 354. Of course, rotation of input shaft 306 in a direction opposite direction 352 would cause output gear 304 to rotate in a direction opposite direction 354. In that regard, output gear 304 may be rotated clockwise or counter-clockwise in response to rotation of input gear 302, though output gear 304 and input gear 302 will rotate in opposite directions. The ratio of the number of gear teeth in plurality of gear teeth 316 of input gear 302 to the number of gear teeth in plurality of gear teeth 318 of output gear 304 (which may be referred to as a gear ratio) may be any suitable ratio. For example, in various embodiments, the gear ratio input gear 302 to output gear 304 is between 1.2:1 to 2:1

Figure 4:
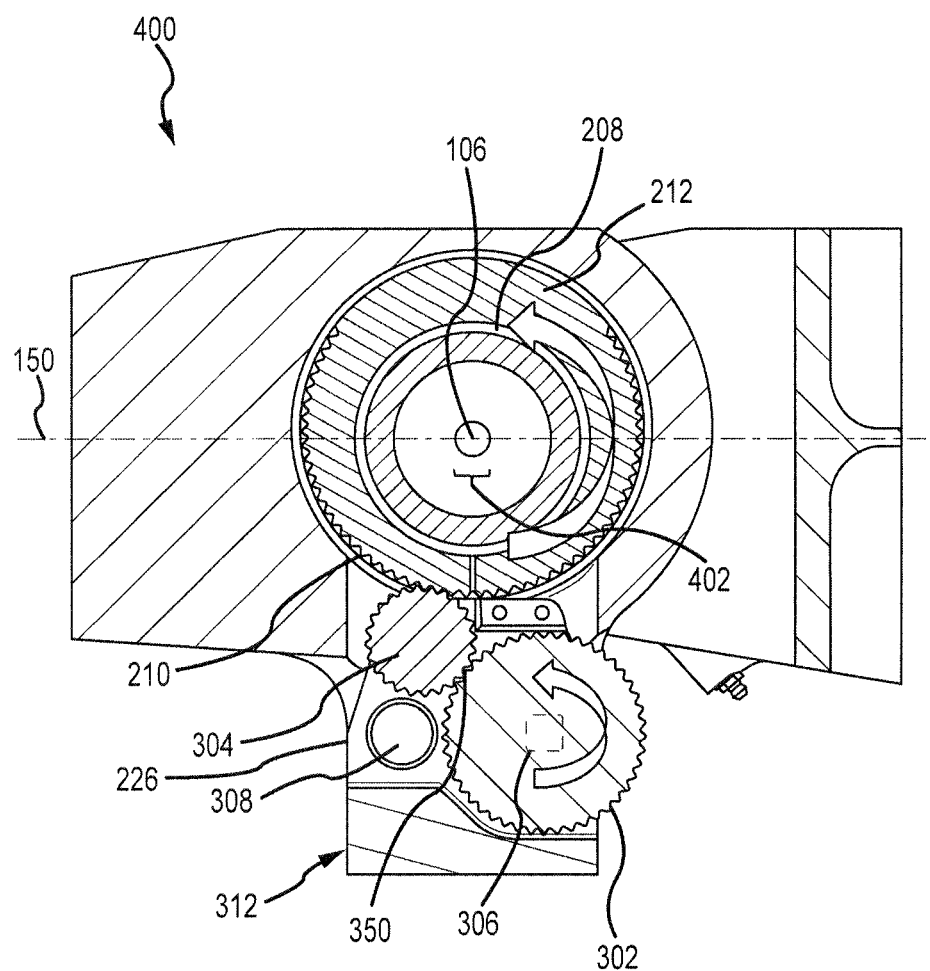
FIG. 4 illustrates, in accordance with various embodiments, an eccentric bushing in meshed engagement with an adjustment tool.

With reference to FIG. 4, cross sectional view 400 illustrates adjustment tool 300 interacting with eccentric bushing assembly 114. In operation, rotation of input shaft 306 may drive input gear 302 to rotate in a first direction. Housing 312 may be coupled to joint housing lugs 226 via a fastener disposed through aperture 320.

Through meshed engagement 350, input gear 302 will drive rotation of output gear 304. Output gear 304 is in meshed engagement with eccentric bushing 212. The rotation of output gear 304 will thus drive rotation of eccentric bushing 212 and secondary bushing 208. In that regard, aperture 106 will be displaced along a diameter of eccentric bushing 212, here shown as displacement 402. In that regard, rotation of input gear 302 in a first direction will effect displacement of aperture 106 in a first direction and rotation of input gear 302 in a second direction will effect displacement of aperture 106 in a second direction. Displacement 402 may be along line 150. Thus, stay length 102 may be increased or decreased by displacement along line 150.

Figure 5:
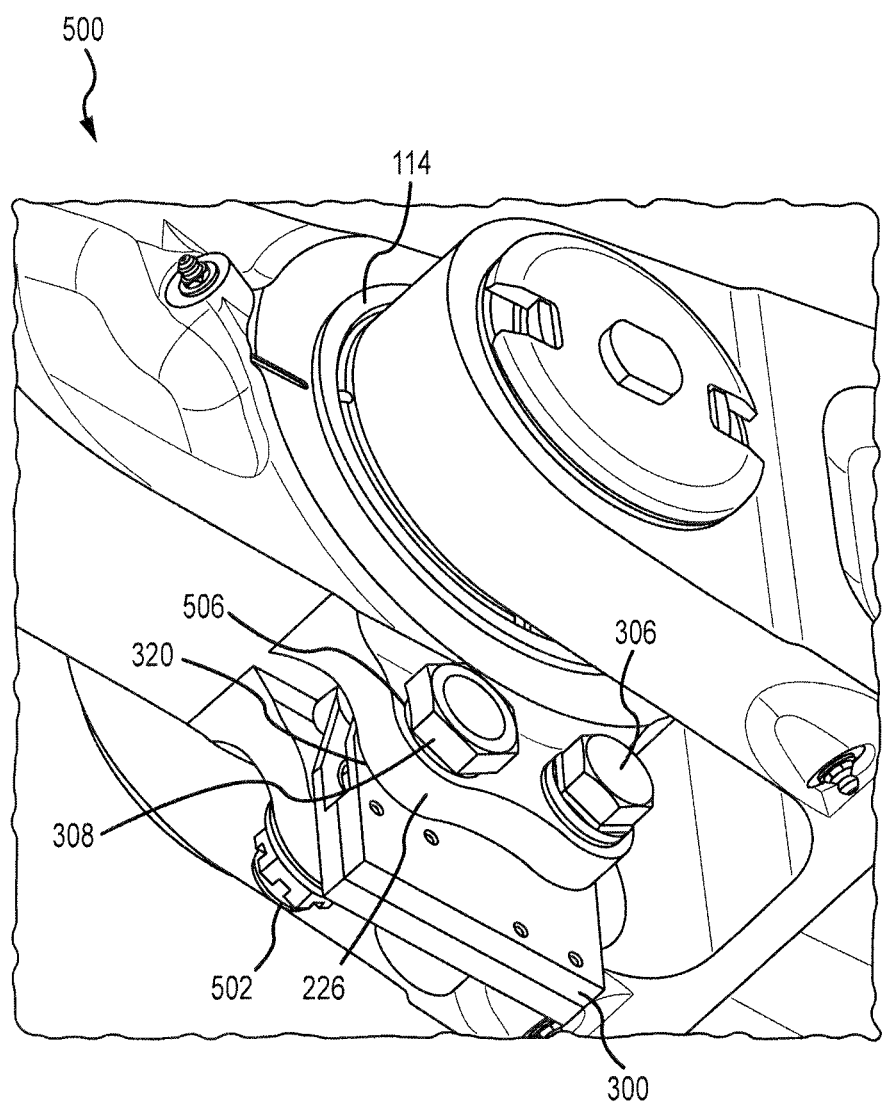
FIG. 5 illustrates, in accordance with various embodiments, an exterior view of an eccentric bushing in meshed engagement with an adjustment tool.

With reference to FIG. 5, an exterior view 500 is shown of adjustment tool 300. Bolt 308 passes through aperture 506 of joint housing lugs 226 and aperture 320 of securing adjustment tool 300 to secure adjustment tool 300 to joint housing lugs 226. Nut 502 is used to secure bolt 308.

After adjustment, locking key 202 may be take the place of adjustment tool 300, such as the in the configuration shown in FIG. 2. Locking key 202 may thus constrain the eccentric bushing 212 from rotation until adjustment is desired.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
    an eccentric bushing having a plurality of circumferentially disposed gear teeth;
    a secondary bushing disposed within the eccentric bushing;
    an aperture disposed within the secondary bushing; and
    an input gear having input gear teeth and an output gear having output gear teeth,
    wherein the input gear teeth and the output gear teeth are in meshed engagement and in contact,
    wherein the output gear teeth are configured to be placed into meshed engagement and in contact with the plurality of circumferentially disposed gear teeth of the eccentric bushing,
    wherein rotation of the output gear causes rotation of the eccentric bushing, and
    wherein rotation of the eccentric bushing causes the aperture to be displaced along a diameter of the eccentric bushing to adjust a stay length of a landing gear.

2. The apparatus of claim 1, further comprising a plurality of joint housing lugs comprising a mounting aperture.

3. The apparatus of claim 2, wherein the mounting aperture is configured to accept a fastener passing through a housing.

4. The apparatus of claim 3, wherein the output gear and the input gear are mounted for rotation on the housing.

5. The apparatus of claim 3, wherein the housing supports an input shaft that is centrally coupled to the input gear, wherein the input gear is configured to rotate about the input shaft.

6. The apparatus of claim 2, wherein the plurality of joint housing lugs is configured to mate with a locking key.

7. The apparatus of claim 6, wherein the locking key comprises a plurality of gear teeth configured to be in meshed engagement with the eccentric bushing.

8. The apparatus of claim 7, wherein the plurality of joint housing lugs is configured to be secured to the locking key such that the locking key is configured to prevent rotation of the eccentric bushing.

* * * * *